(12) United States Patent
Lee et al.

(10) Patent No.: US 9,432,900 B2
(45) Date of Patent: Aug. 30, 2016

(54) METHOD FOR PERFORMING HANDOVER IN WIRELESS COMMUNICATION SYSTEM AND APPARATUS FOR SAME

(75) Inventors: Youngdae Lee, Anyang-si (KR);
Sunghoon Jung, Anyang-si (KR);
Seungjune Yi, Anyang-si (KR);
Sungduck Chun, Anyang-si (KR);
Sungjun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 133 days.

(21) Appl. No.: 13/985,820

(22) PCT Filed: Apr. 2, 2012

(86) PCT No.: PCT/KR2012/002464
§ 371 (c)(1),
(2), (4) Date: Aug. 15, 2013

(87) PCT Pub. No.: WO2012/138090
PCT Pub. Date: Oct. 11, 2012

(65) Prior Publication Data
US 2013/0324129 A1 Dec. 5, 2013

Related U.S. Application Data

(60) Provisional application No. 61/473,157, filed on Apr. 8, 2011.

(51) Int. Cl.
*H04W 8/20* (2009.01)
*H04W 36/08* (2009.01)
*H04W 36/24* (2009.01)
*H04W 4/06* (2009.01)
*H04W 72/12* (2009.01)
*H04W 36/00* (2009.01)
*H04W 76/00* (2009.01)

(52) U.S. Cl.
CPC ............... *H04W 36/24* (2013.01); *H04W 4/06* (2013.01); *H04W 36/0088* (2013.01); *H04W 72/1247* (2013.01); *H04W 8/20* (2013.01); *H04W 76/002* (2013.01)

(58) Field of Classification Search
None
See application file for complete search history.

(56) References Cited

U.S. PATENT DOCUMENTS

2011/0077006 A1  3/2011  Hsu
2011/0194477 A1* 8/2011  Damnjanovic et al. ...... 370/312
2013/0070660 A1* 3/2013  Xu ..................... H04W 72/005
                                                    370/312

FOREIGN PATENT DOCUMENTS

CN  101883327 A  * 11/2010  .......... H04W 72/005
EP      2200367     * 6/2010
KR  1020100016488 A   2/2010
KR  1020100024990 A   3/2010
KR  1020100071796 A   6/2010

* cited by examiner

*Primary Examiner* — Lester Kincaid
*Assistant Examiner* — Daniel G Bassett
(74) *Attorney, Agent, or Firm* — Dentons US LLP (57) ABSTRACT

The present invention relates to a method for a user equipment performing a handover in a wireless communication system, and more specifically, comprises the following steps: transmitting to a serving cell a measurement report message on a target cell including an indicator related to a specific service; receiving from the serving cell a handover command message including information on the specific service, which is provided by the target cell; receiving resource allocation information on the specific service from the target cell using the information on the specific service; and transmitting a handover completion message to the target cell.

5 Claims, 9 Drawing Sheets

(a) CONTROL-PLANE PROTOCOL STACK (b) USER-PLANE PROTOCOL STACK

METHOD FOR PERFORMING HANDOVER IN WIRELESS COMMUNICATION SYSTEM AND APPARATUS FOR SAME

This application is a 35 USC §371 National Stage entry of International Application No. PCT/KR2012/002464 filed on Apr. 2, 2012, which claims the benefit and priority to U.S. Provisional Application No. 61/473,157 filed Apr. 8, 2011, all of which are incorporated by reference in their entirety herein.

TECHNICAL FIELD

The present invention relates to a method of performing a handover in a wireless communication system, and more particularly, to a method of performing a handover for a broadcast service in a wireless communication system and apparatus therefor.

BACKGROUND ART

3GPP LTE ($3^{rd}$ generation partnership projecting long term evolution) communication system is schematically described for one example of a wireless communication system to which the present invention is applicable.

Figure 1:
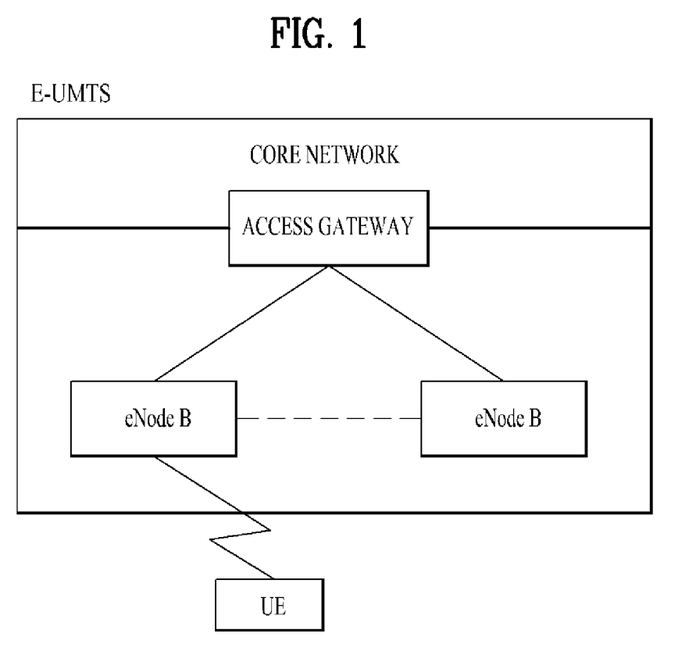
FIG. 1 is a schematic diagram of E-UMTS network structure as an example of a mobile communication system.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE OF THE INVENTION

Technical Problem

Based on the above-mentioned discussion, a method of performing a handover in a wireless communication system and apparatus therefor shall be proposed in the following description.

Technical Solution

To achieve these and other advantages and in accordance with the purpose of the present invention, as embodied and broadly described, a method of performing a handover, which is performed by a user equipment in a wireless communication system, according to one embodiment of the present invention may include the steps of transmitting a measurement report message for a target cell to a serving cell in a manner that an indicator related to a specific service is included in the measurement report message, receiving a handover command message including an information on the specific service provided by the target cell from the serving cell, receiving a resource allocation information of the specific service from the target cell using the information on the specific service, and transmitting a handover completion message to the target cell.

To further achieve these and other advantages and in accordance with the purpose of the present invention, as embodied and broadly described, a method of performing a handover, which is performed by a cell in a wireless communication system, according to another embodiment of the present invention may include the steps of receiving a measurement report message for a target cell from a user equipment in a manner that an indicator related to a specific service is included in the measurement report message, transmitting a handover request message including the information indicating the specific service to the target cell, receiving the handover request message including the information on the specific service from the target cell, and transmitting a handover command message including the information on the specific service to the user equipment. Preferably, the user equipment may receive a resource allocation information of the specific service from the target cell using the information on the specific service and sends a handover completion message to the target cell.

Preferably, the indicator related to the specific service may indicate whether the specific service is being received or is intended to be received. More preferably, the measurement report message for the target cell may include at least one of an information on a frequency for providing the specific service, an identifier of the specific service and an area identifier corresponding to the specific service.

Preferably, the information on the specific service provided by the target cell may include at least one of a subframe information for the specific service, a masking information for obtaining a resource allocation information of the specific service and a list of areas for providing the specific service.

Preferably, the specific service may include an MBMS (multimedia broadcast multicast service).

Advantageous Effects

According to an embodiment of the present invention, a network can provide an effective MBMS (multimedia broadcast multicast service) to a user equipment. In particular, if a network provides useful information to a user equipment that receives or intends to receive MBMS in the course of a handover procedure, the user equipment can be efficiently provided with a preferred MBMS.

Effects obtainable from the present invention are non-limited by the above mentioned effect. And, other unmentioned effects can be clearly understood from the following description by those having ordinary skill in the technical field to which the present invention pertains.

BEST MODE FOR INVENTION

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

Figure 2:
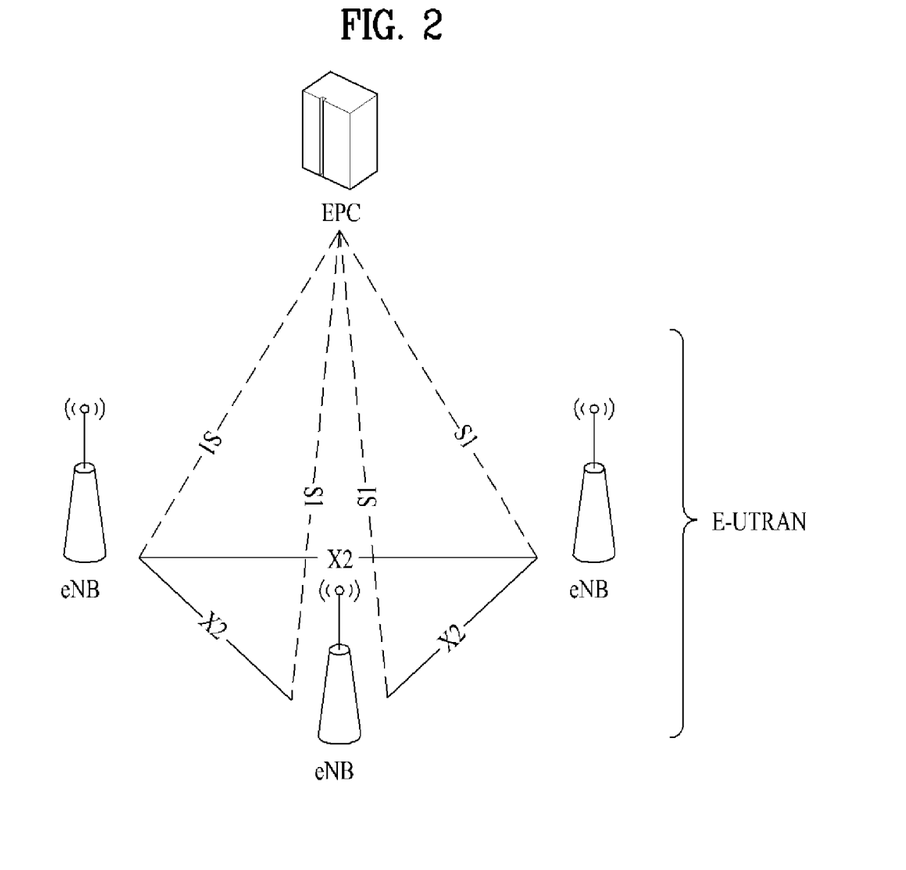
FIG. 2 is a conceptional diagram of a network structure of E-UTRAN (evolved universal terrestrial radio access network).

FIG. 2 is a conceptional diagram of a network structure of E-UTRAN (evolved universal terrestrial radio access network). In particular, the E-UTRAN system is the system evolved from a conventional UTRAN system. The E-UTRAN includes cells (e.g., eNBs). And, the cells are connected via an X2 interface with each other Each of the cell is connected to a user equipment via a radio interface and is also connected to an evolved packet core (EPC) via an S1 interface.

The EPC includes MME (Mobility Management Entity), S-GW (Serving-Gateway) and PDN-GW (Packet Data Network-Gateway). The MME has an information of a user equipment or an information on capability of the user equipment. Such information is mainly used for management of mobility of the user equipment. The S-GW is a gateway having the E-UTRAN as a terminal end point. And, the PDN-GW is a gateway having a packet data network (PDN) as a terminal end point.

Figure 3:
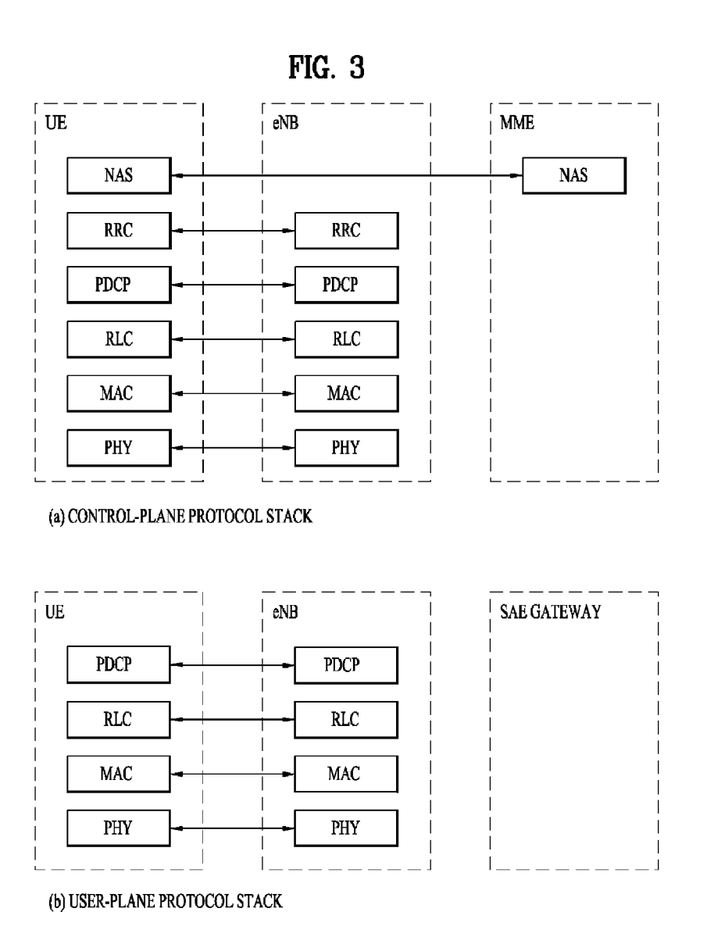
FIG. 3 is a diagram of structures of control and user planes of a radio interface protocol between a user equipment and E-UTRAN based on 3GPP radio access network specification.

FIG. 3 is a diagram of structures of control and user planes of a radio interface protocol between a user equipment and E-UTRAN based on 3GPP radio access network specification. First of all, a control plane means a passage for transmitting control messages used by a user equipment and a network to mange a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer of the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. To this end, the RRC layer of the user equipment exchanges RRC messages with the RRC layer of the network.

A single cell constructing a base station (eNB) is configured to have one of bandwidths including 1.25 MHz, 2.5 MHz, 5 MHz, 10 MHz, 15 MHz, 20 MHz and the like and provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH).

Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 4:
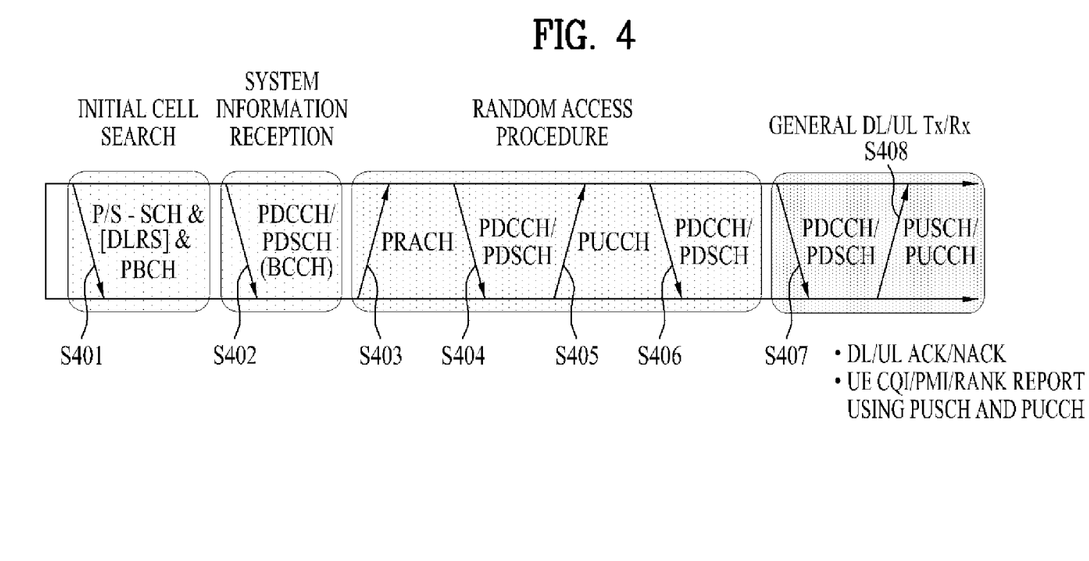
FIG. 4 is a diagram for explaining physical channels used for 3GPP system and a general method of transmitting a signal using the same.

FIG. 4 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S401]. To this end, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S402].

Meanwhile, if the user equipment initially accesses the base station or fails to have a radio resource for signal transmission, the user equipment is able to perform a random access procedure (RACH) on the base station [S403 to S406]. For this, the user equipment transmits a specific sequence as a preamble via a physical random access channel (PRACH) [S403] and is then able to receive a response message via PDCCH and a corresponding PDSCH in response to the preamble [S404]. In case of contention based RACH, it is able to perform a contention resolution procedure in addition.

Having performed the above mentioned procedures, the user equipment is able to perform PDCCH/PDSCH reception [S407] and PUSCH/PUCCH (physical uplink shared channel/physical uplink control channel) transmission [S408] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 5:
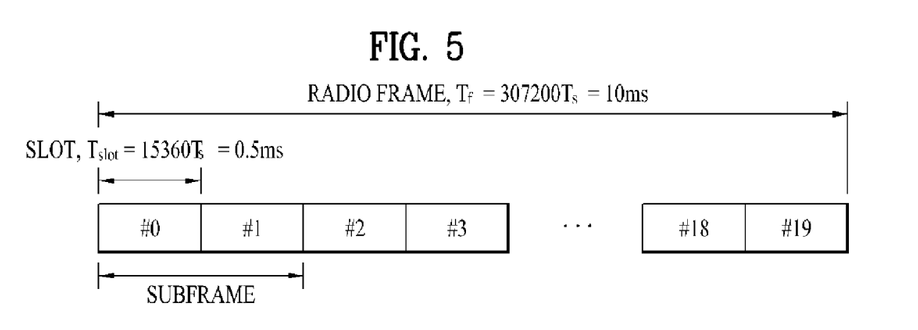
FIG. 5 is a diagram for an example of a structure of a radio frame used for LTE system.

FIG. 5 is a diagram for an example of a structure of a radio frame used by LTE system.

Referring to FIG. 5, a radio frame has a length of 10 ms ($327200 \times T_s$) and is constructed with 10 subframes in equal size. Each of the subframes has a length of 1 ms and is constructed with two slots. Each of the slots has a length of 0.5 ms ($15360 \times T_s$). In this case, $T_s$ indicates a sampling time and is expressed as $T_s=1/(15\ kHz \times 2048)=3.2552 \times 10^{-8}$ (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

In the following description, an RRC state of a user equipment and an RRC connecting method are explained.

First of all, the RRC state means whether an RRC of a user equipment is logically connected to an RRC of E-UTRAN (i.e., logical connection). If the RRCs are connected to each other, it is called an RRC connected state (RRC_CONNECTED). If the RRCs are not connected to each other, it can be called an RRC idle state (RRC_IDLE).

Since E-UTRAN is able to obtain an existence of a user equipment in an RRC connected state by a cell unit, it is able to effectively control the user equipment. On the contrary, the E-UTRAN is unable to obtain a user equipment in an idle state by a cell unit and the corresponding user equipment is managed by a CN by a TA unit that is an area unit greater than a cell. In particular, in order to receive such a service as voice and data from a cell, a user equipment in an RRC idle state should make a transition to an RRC connected state.

Particularly, when a user initially turns on a power of a user equipment, the user equipment searches for an appropriate cell and then stays in an RRC idle state at the corresponding cell. If the user equipment staying in the RRC idle state needs to establish an RRC connection, it makes a transition to an RRC connected state by performing an RRC connection establishment process. In particular, if the RRC connection needs to be established, it may mean the case that an uplink data transmission is necessary due to user's call attempt or the like or the case that a response message needs to be sent in case of receiving a paging message from the E-UTRAN.

Figure 6:
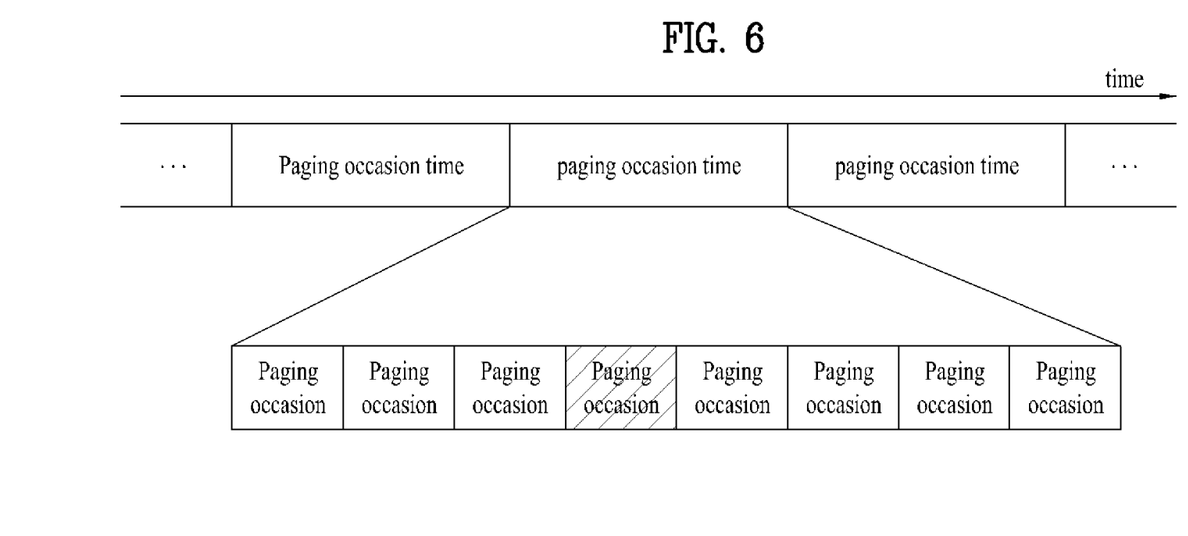
FIG. 6 is a diagram for explaining a general transceiving method using a paging message.

FIG. 6 is a diagram for explaining a general transceiving method using a paging message.

Referring to FIG. 6, a paging message contains a paging cause and a paging record including a UE identity and the like. When the paging message is received, a user equipment is able to perform a discontinuous reception (DRX) for the purpose of power consumption reduction.

In particular, a network configures several paging occasions (POs) for each time cycle called a paging DRX cycle to enable a specific user equipment to obtain a paging message by receiving a specific paging occasion only. The user equipment does not receive a paging channel in a time except the specific paging occasion and is able to stay in a sleep mode to reduce power consumption. And, one paging occasion corresponds to one TTI.

A base station and a user equipment use a paging indicator (PI) as a specific value indicating a transmission of a paging message. The base station defines a specific identity (e.g., paging-radio network temporary identity: P-RNTI) for a usage of the PI and is then able to inform the user equipment of the paging information transmission. For instance, a user equipment wakes up each DRX cycle and then receives one subframe to recognize a presence or non-presence of a paging message. If P-RNTI is contained in L1/L2 control channel (PDCCH) of the received subframe, the user equipment is able to recognize that the paging message exists in PDSCH of the corresponding subframe. If a UE identity (e.g., IMSI) of the user equipment is contained in the paging message, the user equipment makes a response (e.g., RRC connection, system information reception, etc.) to the base station and is then able to receive a service.

In the following description, system information is explained. First of all, the system information should contain necessary information a user equipment should be aware of to access a base station. Therefore, the user equipment should receive all system information before accessing the base station and should have latest system information all the time. Since all user equipments in a cell should be aware of the system information, the base station periodically transmits the system information.

System information can be divided into MIB (Master Information Block), SB (Scheduling Block) and SIB (System Information Block). The MIB enables a user equipment to recognize such a physical configuration of a corresponding cell as a bandwidth and the like. The SB indicates such transmission information of SIBs as a transmission cycle and the like. In this case, the SIB is an aggregate of system informations related to each other. For instance, a specific SIB contains information of a neighbor cell only and another SIB just contains information of a UL radio channel used by a user equipment.

In the following description, a cell selection process and a cell reselection process are explained.

First of all, if a power of a user equipment is turned on, the user equipment selects a cell of an appropriate quality and should perform preparation procedures to receive a service. A user equipment in an RRC idle state selects a cell of an appropriate quality and should be then prepared for being provided with a service through the selected cell all the time. For instance, if a power of a user equipment is turned on just at the moment, the user equipment should select a cell of an appropriate quality to register with a network. Once the user equipment in the RRC connected state enters an RRC idle state, the corresponding user equipment should select a cell to stay in the RRC idle state. Thus, a process for a user equipment to select a cell, which meets a specific condition, to stay in such a service standby state as an RRC idle state is called a cell selection. Since a user equipment performs a cell selection while failing in determining a cell to stay in an RRC idle state, it is very important to select a cell as quickly as possible. Hence, if a cell provides a radio signal quality over a predetermined level, although this cell does not provide a best radio signal quality to a user equipment, the corresponding cell may be selected in the course of a cell selecting process performed by the user equipment.

Once a user equipment selects a cell succeeding in meeting a cell selection reference, the user equipment obtains information required for an operation of the user equipment in an RRC idle state in the corresponding cell from system information of the corresponding cell. After the user equipment has receives all the information required for the operation of the user equipment in the RRC idle state, the user equipment stand by in the RRC idle state to make a request for a service to a network or to receive a service from the network.

After a user equipment has selected a prescribed cell by the cell selecting process, a strength or quality of a signal between the user equipment and a base station may change due to mobility of the user equipment, a radio environment fluctuation and the like. Therefore, if the quality of the selected cell is degraded, the user equipment may be able to select another cell that provides a better quality. Thus, if a cell is reselected, a cell capable of providing a signal quality better than that of a currently selected cell is selected in general. This process is called a cell reselection. In aspect of a quality of a radio signal, the basic object of this cell reselecting process is to select a cell that provides a best quality to a user equipment in general. Beside the aspect of the radio signal quality, a network determines a priority for each frequency and may be then inform a user equipment of the determined priority. Having received the determined priority, the user equipment preferentially considers this priority in the cell reselecting process prior to the radio signal quality reference.

In the following description, MBMS (multimedia broadcast multicast service) is explained. First of all, MBMS (multimedia broadcast multicast service) is a kind of a broadcast/multicast service and is the service for transmitting multimedia data packets to a plurality of user equipments simultaneously. 'Broadcast/multicast service' or '/MBMS' used in the present disclosure can be substituted with such a terminology as 'point-to-multipoint service', 'MBS (multicast and broadcast service)' and the like. In the MBMS based on IP multicast, user equipments share a resource required for data packet transmission with each other and then receive the same multimedia data. Hence, in case that user equipments on a predetermined level using MBMS exist in the same cell, it is able to raise resource efficiency. Since the MBMS has no relation with an RRC connected state, a user equipment in an idle state is able to receive the corresponding service.

Figure 7:
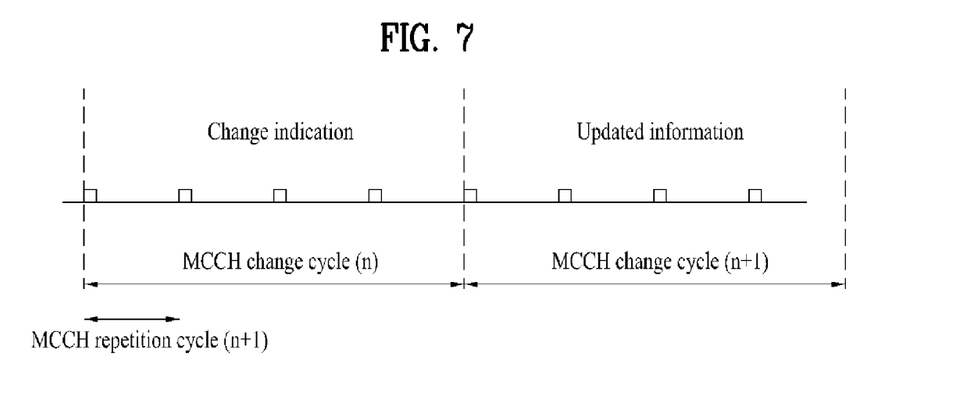
FIG. 7 is a diagram to describe an MCCH (MBMS control channel) information transmitting scheme.

A logical channel MCCH (MBMS control channel) or MTCH (MBMS traffic channel) for MBMS can be mapped to a transport channel MCH (MBMS channel). The MCCH carries an RRC message containing MBMS related common control information, while the MTCH carries a traffic of a specific MBMS service. A single MCCH exists in a single MBSFN (MBMS single frequency network) area to carry the same MBMS information or traffic. In case that a plurality of MBSFN areas are provided by a single cell, a user equipment may be able to receive a plurality of MCCHs. FIG. 7 shows a transmission scheme of MCCH information.

Referring to FIG. 7, if an MBMS related RRC message is changed in a specific MCCH, PDCCH transmits M-RNTI (MBMS-radio network temporary identity) and an MCCH indicator indicating a specific MCCH. A user equipment, which supports MBMS, receives the M-RNTI and the MCCH indicator via the PDCCH, recognizes that the MBMS related RRC message has been changed, and is then able to receive the specific MCCH. The RRC message of the MCCH can be changed each change cycle and is repeatedly broadcasted each repetitive cycle. FIG. 7 shows a transmission scheme of MCCH information.

Meanwhile, the MCCH transmits MBSFNAreaConfiguration message that indicates an ongoing MBMS session and a corresponding RB setting. And, the MCCH is able to transmit an MBMS counting request (MBMSCountingRequest) message for counting the number of user equipments in an RRC connected state, each of which receives or intends to receive at least one MBMS service.

A specific MBMS control information can be provided via BCCH. In particular, the specific MBMS control information can be contained in SystemInformationBlockType13 broadcasted via the BCCH.

In the following description, a method for a user equipment in RRC connected mode to perform a handover in the course of receiving an MBMS or in order to receive a specific MBMS according to an embodiment of the present invention is explained.

Figure 8:
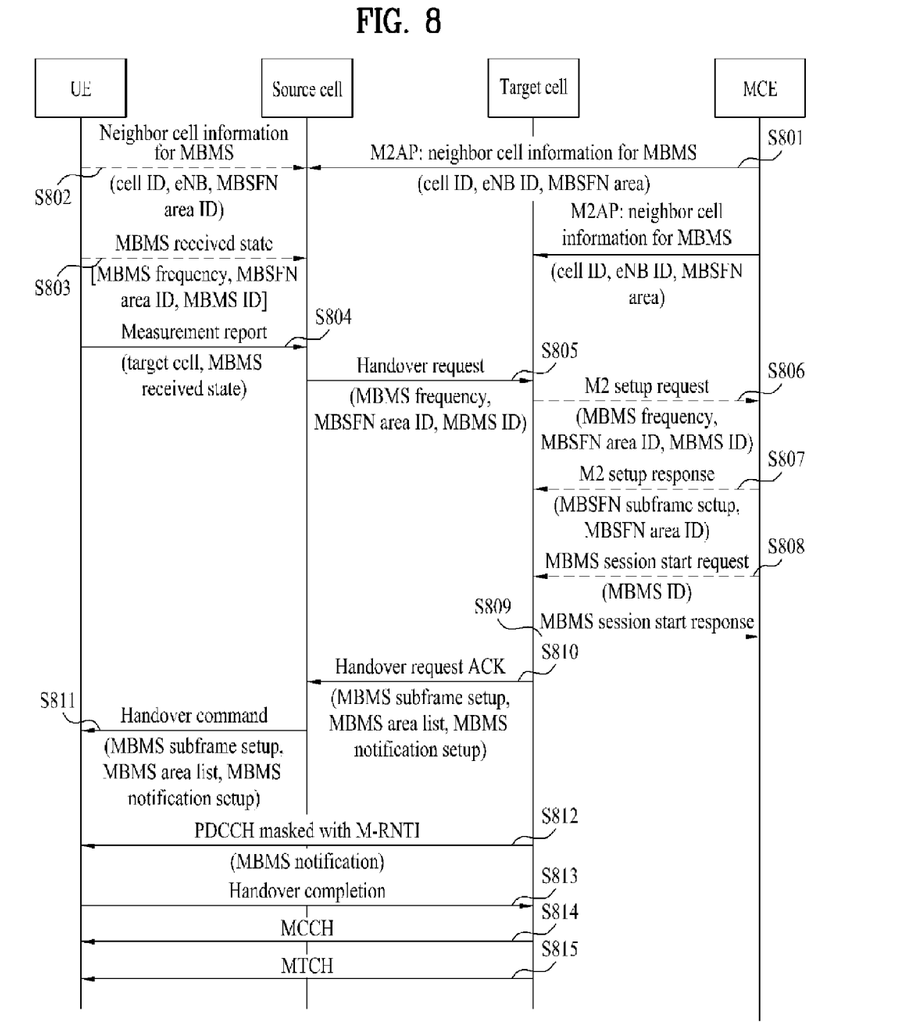
FIG. 8 is a diagram for one example of a handover performing method according to an embodiment of the present invention.

FIG. 8 is a diagram for one example of a handover performing method according to an embodiment of the present invention.

Referring to FIG. 8, a network, and more particularly, an MCE (MBMS coordinating entity) informs a cell, which provides a specific MBMS or a specific MBSFN area, of information on neighbor cell(s) providing the same MBMS or the same MBSFN area [S801]. FIG. 8 shows one example that the MCE provides the information to a serving cell and a neighbor cell (e.g., a target cell in FIG. 8) of the serving cell.

A user equipment receives MCCH from a neighbor cell in another way and then checks whether the corresponding cell provides the specific MBMS/MBSFN area. Subsequently, the user equipment can report an information, which indicates which neighbor cells provide the specific MBMS/MNSFN area, to the serving cell [S802].

And, the user equipment can report MBMS received state information to the serving cell [S803]. In this case, the MBMS received state information indicates whether the user equipment is receiving or intends to receive a specific MBMS, includes a frequency for providing the specific MBMS and an MBSFN area ID, and may further include an ID of the specific MBMS.

Subsequently, the user equipment performs a measurement on the target cell. If a quality of the measured target cell is equal to or greater than a preset value, the user equipment can report a result of the measurement on the target cell to the serving cell (i.e., a source cell in aspect of handover) [S804]. In doing so, the user equipment can transmit the MBMS received state information in a manner that the MBMS received state information is included in a measurement report message. In this case, the MBMS received state information can indicate whether the user equipment is receiving the MBMS on a frequency of the target cell or whether the user equipment is interested in receiving the MBMS. Moreover, as mentioned in the foregoing description, the MBMS received state information includes the frequency of the target cell and the MBSFN area ID and may further include an ID of the specific MBMS.

The source cell sends a handover request message to the target cell [S805]. In this case, the handover request message includes the MBMS received state information received from the user equipment. In particular, if the user equipment is interested in the MBMS or is receiving the MBMS, the MBMS received state information may include a frequency for providing the corresponding MBMS, an MBSFN area ID, or an MBMS ID.

Although the target cell has received the MBMS received state information included in the handover request message but does not provide the corresponding MBSFN area or MBMS, the target cell can make a request for offering the corresponding MBMS by transmitting an M2 setup request message to the MCE [S806]. In this case, the M2 setup request message can include a frequency for providing the corresponding MBMS, an MBSFN area or an MBMS ID.

Having received the M2 setup request message, the MCE sends an M2 setup response message to the target cell [S807]. In this case, the M2 setup response message includes MBSFN subframe setup for the frequency, MBSFN area or MBMS and may further include the corresponding MBSFN area ID.

Subsequently, for a session start of the MBMS, the MCE sends an MBMS session start request message including the MBMS ID to the target cell [S808]. In this case, 'session start' means that a data transmission of the corresponding MBMS is ready.

In response to the MBMS session start request message, the target cell sends an MBMS session start response message to the MCE [S809]. On the other hand, the MBMS session start request message and the MBMS session start response message may be replaced by an MBMS scheduling information request message and an MBMS scheduling information response message to perform the same functions, respectively.

Although the steps S806 to 809 assume the case that the target cell does not provide the corresponding MBSFN area or the MBMS currently, it may be necessary to consider a case that the target cell has provided the corresponding MBSFN area or the MBMS and then suspends the corresponding MBSFN area or the MBMS from being provided. For instance, a cell can obtain the number of user equipments that receives or intends to receive MBMS through an MBMS counting request process. Although user equipments used to be provided with MBMS and a cell provides the MBMS, since most of the user equipments leave a cell coverage, if there is no user equipment provided with MBMS currently, the corresponding cell is able to preferentially suspend, rather than stop, the currently provided MBMS.

In this situation, the steps S806 to S809 can be replaced by MBMS suspending and resuming procedures. In particular, if the user equipments used to be provided with the MBMS by the target cell barely exist at the present time, the target cell can perform a procedure for suspending the corresponding MBMS on the MCE. Moreover, if user equipments, which are receiving or intend to receive the MBMS, reappear in a preset time (through a handover procedure of the present invention or the like), the target cell can perform a procedure (resumption) for resuming the corresponding MBMS on the MCE. On the contrary, if user equipments, which are receiving or intend to receive the MBMS, do not exist in a preset time, the suspended MBMS may be stopped.

Referring now to FIG. 8, if the target cell is ready to provide the MBMS, the target cell can send a handover request response message to the source cell [S810]. In this case, the handover request response message may include an MBSFN subframe setup information, an MBMS notification setup information, an MBSFN area information list and the like. For reference, the MBSFN subframe setup information and the MBMS notification information are the informations originally broadcasted on SIB2 (SystemInformationBlockType2) and SIB13 of the target cell, respectively. And, the MBSFN area information list is the information carried on MCCH. Yet, according to the present invention, the above-mentioned informations can be included in the handover request response message in order to increase signaling efficiency. In this case, 'MBMS notification' is the information for informing a user equipment of a session start and transmitting a corresponding resource information. And, the MBMS notification setup information is the information for receiving the MBMS notification. In this case, the MBMS notification setup information may include M-RNTI.

Having received the handover request response message, the source cell sends a handover command message to the user equipment [S811].

Having received the handover command message from the source cell, the user equipment can receive the MBMS notification transmitted by the target cell using the information included in the corresponding handover command [S812]. In particular, the user equipment can obtain the MBMS notification by blind decoding PDCCH masked with the M-RNTI. Having obtained the MBMS notification, the user equipment sends a handover completion message to the target cell [S813].

Finally, if the MBMS notification indicates the information change in the MBSFN area that provides the MBMS, the user equipment obtains the changed information by receiving MCCH of the corresponding MBSFN area. Moreover, if the MCCH indicates a session start of the corresponding MBMS, the user equipment sets up MTCH of the corresponding service and then receives MBMS data [S815].

According to the present invention, a user equipment efficiently performs a handover into a cell that provides MBMS, thereby receiving a specific MBMS smoothly.

Figure 9:
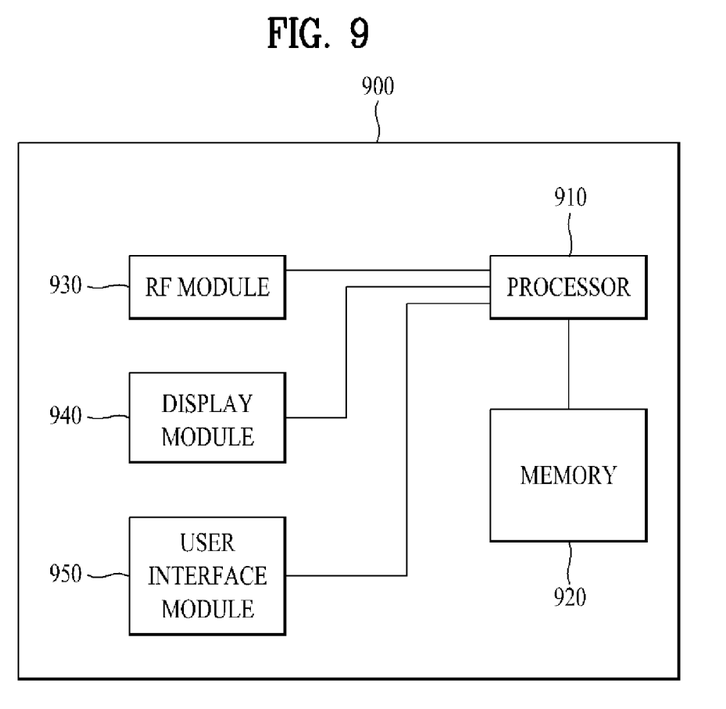
FIG. 9 is a block diagram for one example of a communication device according to one embodiment of the present invention.

FIG. 9 is a block diagram for one example of a communication device according to one embodiment of the present invention.

Referring to FIG. 9, a communication device 900 includes a processor 910, a memory 920, an RF module 930, a display module 940 and a user interface module 950.

The communication device 900 is illustrated for clarity and convenience of the description and some modules can be omitted. Moreover, the communication device 900 is able to further include at least one necessary module. And, some modules of the communication device 900 can be further divided into sub-modules. The processor 910 is configured to perform operations according to the embodiment of the present invention exemplarily described with reference to the accompanying drawings. In particular, the detailed operations of the processor 910 can refer to the contents described with reference to FIGS. 1 to 8.

The memory 920 is connected to the processor 910 and stores an operating system, applications, program codes, data and the like. The RF module 930 is connected to the processor 910 and performs a function of converting a baseband signal to a radio signal or converting a radio signal to a baseband signal. For this, the RF module 930 performs analog conversion, amplification, filtering and frequency uplink transform or inverse processes thereof. The display module 940 is connected to the processor 910 and displays various kinds of informations. The display module 940 can include such a well-known element as LCD (Liquid Crystal Display), LED (Light Emitting Diode), OLED (Organic Light Emitting Diode) and the like, by which the present invention is non-limited. The user interface module 950 is connected to the processor 910 and can include a combination of well-known interfaces including a keypad, a touchscreen and the like.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of the appended claims or that those claims can be included as new claims by revision after filing an application.

Embodiments of the present invention can be implemented using various means. For instance, embodiments of the present invention can be implemented using hardware, firmware, software and/or any combinations thereof. In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of performing a handover in a wireless communication system and apparatus therefor are described mainly with reference to examples applied to 3GPP LTE system, as mentioned in the foregoing description, the present invention is applicable to various kinds of wireless communication systems as well as the 3GPP LTE system.

What is claimed is:

1. A method of performing a handover by a user equipment (UE) in a wireless communication system, the method comprising:

transmitting a measurement report message for a target cell to a serving cell, wherein the measurement report message includes an indicator for a specific Multimedia Broadcast Multicast Service (MBMS) service indicating whether the specific MBMS service is being received or is intended to be received by the UE and a MBMS Single Frequency Network (MBSFN) area identifier corresponding to the specific MBMS service;

receiving a handover command message including MBSFN subframe information for the specific MBMS service, masking information for obtaining the resource allocation information of the specific MBMS service and a list of MBSFN areas for providing the specific MBMS service from the serving cell;

receiving a MBMS notification from the target cell based on the information included in the handover command message; and identifying information regarding session start and the resource allocation used for receiving MBMS data in a specific MBSFN area based on the MBMS notification.

2. The method of claim 1, wherein the measurement report message for the target cell further includes at least one of information on a frequency for providing the specific MBMS service and an identifier of the specific MBMS service.

3. A method of performing a handover by a cell in a wireless communication system, the method comprising:

receiving, at a source cell, a measurement report message for a target cell from a user equipment (UE), wherein the measurement report message includes an indicator related to a specific Multimedia Broadcast Multicast Service (MBMS) service indicating whether the specific MBMS service is being received or is intended to be received by the UE and a MBMS Single Frequency Network (MBSFN) area identifier corresponding to the specific MBMS service;

transmitting, from a source cell, a handover request message including information indicating the specific MBMS service to the target cell;

receiving, at the source cell, a handover response message including information on the specific MBMS service from the target cell; and transmitting, from the source cell, a handover command message including MBSFN subframe information for the specific MBMS service, masking information for obtaining the resource allocation information of the specific MBMS service and a list of MBSFN areas for providing the specific MBMS service to the UE;

transmitting, from the target cell, transmits a MBMS notification to the UE using the information included in the handover command message; and transmitting, from the target cell to the UE, MBMS data in a specific MBSFN area, in response to a session start and a resource allocation as identified by the UE based on the MBMS notification.

4. The method of claim 3, wherein the user equipment receives resource allocation information of the specific MBMS service from the target cell using the information on the specific MBMS service and sends a handover completion message to the target cell.

5. The method of claim 3, wherein the measurement report message for the target cell further includes at least one information on a frequency for providing the specific MBMS service and an identifier of the specific MBMS service.

* * * * *